June 19, 1956  D. RINGO ET AL  2,751,032
FLUID TREATING APPARATUS

Filed Nov. 9, 1954  11 Sheets-Sheet 1

INVENTORS
**DAN RINGO
ERNEST B. MILLER**

BY

*Adams & Bush*
ATTORNEYS

June 19, 1956  D. RINGO ET AL  2,751,032
FLUID TREATING APPARATUS
Filed Nov. 9, 1954  11 Sheets-Sheet 2

INVENTORS
DAN RINGO
ERNEST B. MILLER

BY
*Adams + Bush*
ATTORNEYS

INVENTORS
DAN RINGO
ERNEST B. MILLER

June 19, 1956  D. RINGO ET AL  2,751,032
FLUID TREATING APPARATUS
Filed Nov. 9, 1954  11 Sheets-Sheet 5
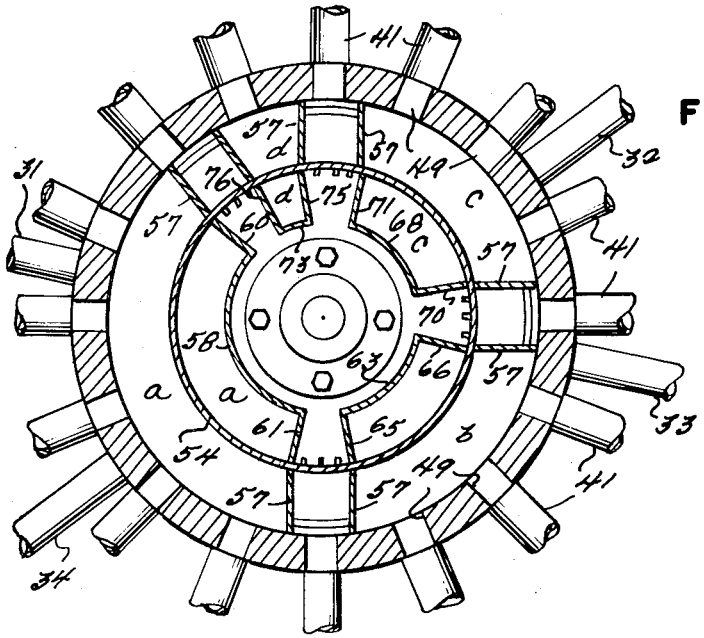
FIG. 5.
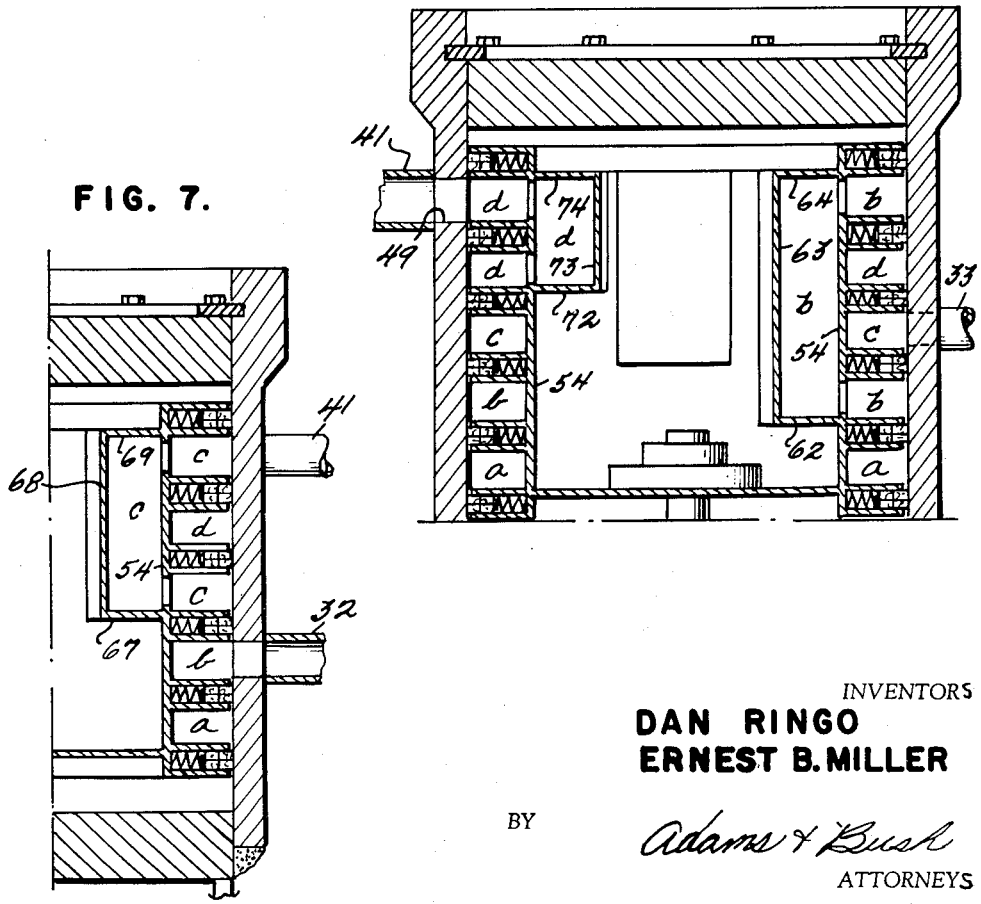
FIG. 6.
FIG. 7.
INVENTORS
DAN RINGO
ERNEST B. MILLER
BY Adams & Bush
ATTORNEYS June 19, 1956  D. RINGO ET AL  2,751,032
FLUID TREATING APPARATUS
Filed Nov. 9, 1954  11 Sheets-Sheet 6
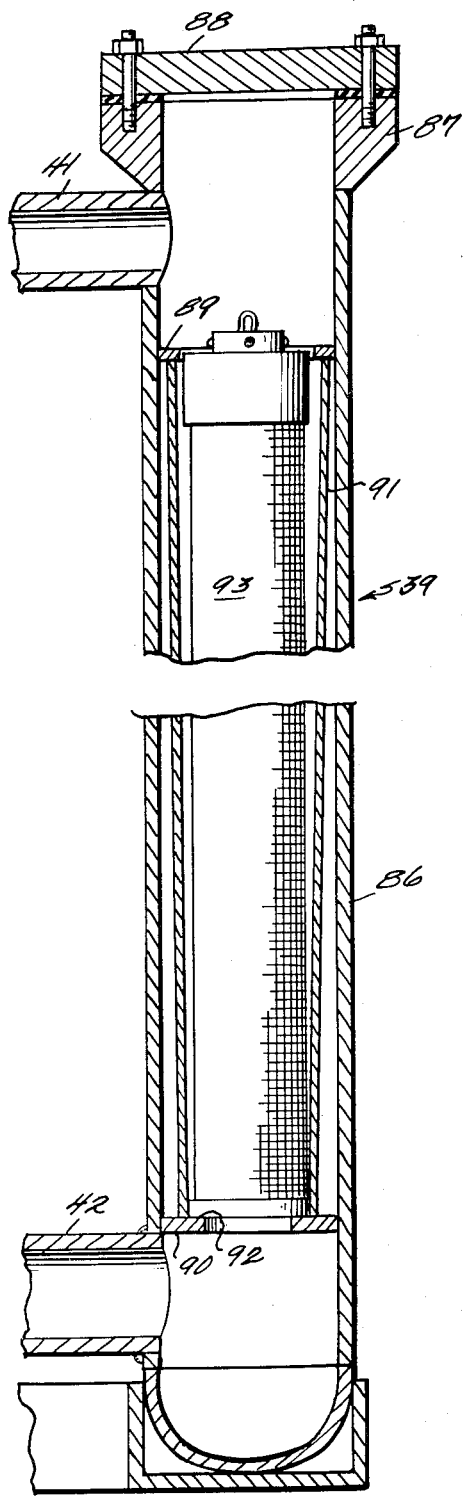
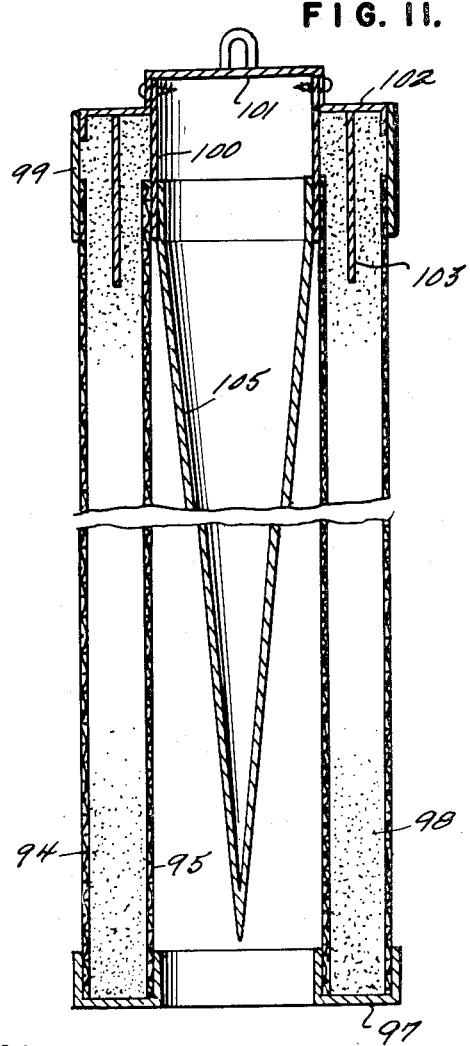
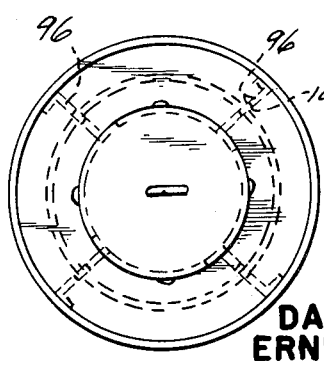
INVENTORS
DAN RINGO
ERNEST B. MILLER
BY
Adams + Bush
ATTORNEYS June 19, 1956 D. RINGO ET AL 2,751,032
FLUID TREATING APPARATUS
Filed Nov. 9, 1954 11 Sheets-Sheet 7

INVENTORS
DAN RINGO
ERNEST B. MILLER
BY *Adams + Bush*
ATTORNEYS

June 19, 1956 D. RINGO ET AL 2,751,032
FLUID TREATING APPARATUS
Filed Nov. 9, 1954 11 Sheets-Sheet 8

INVENTORS
DAN RINGO
ERNEST B. MILLER

BY *Adams + Bush*
ATTORNEYS

June 19, 1956 D. RINGO ET AL 2,751,032
FLUID TREATING APPARATUS
Filed Nov. 9, 1954 11 Sheets-Sheet 9

INVENTORS
DAN RINGO
ERNEST B. MILLER
BY
Adams & Bush
ATTORNEYS

June 19, 1956 D. RINGO ET AL 2,751,032
FLUID TREATING APPARATUS
Filed Nov. 9, 1954 11 Sheets-Sheet 11
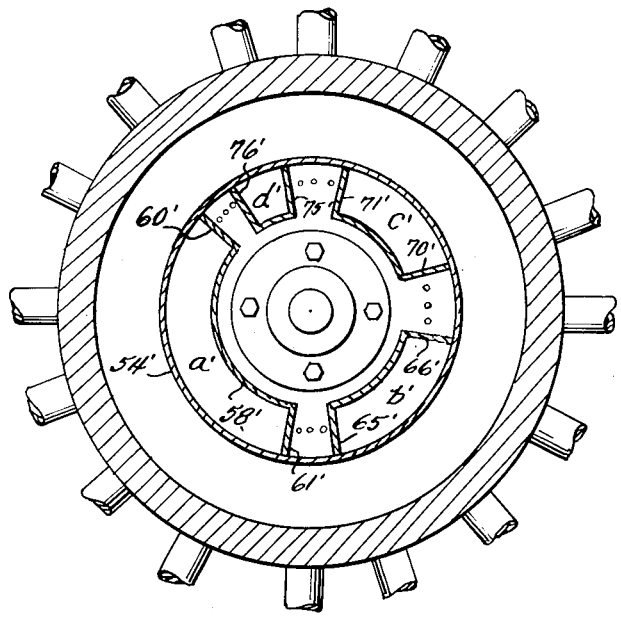
FIG. 17.
FIG. 18.
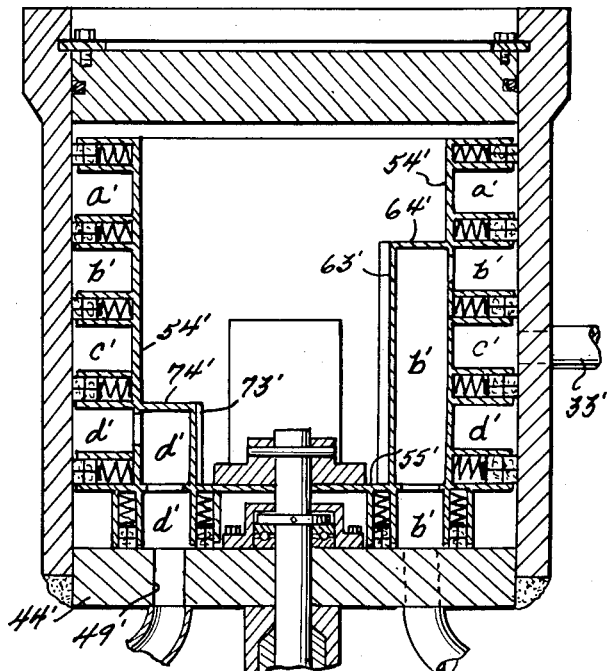
FIG. 19.
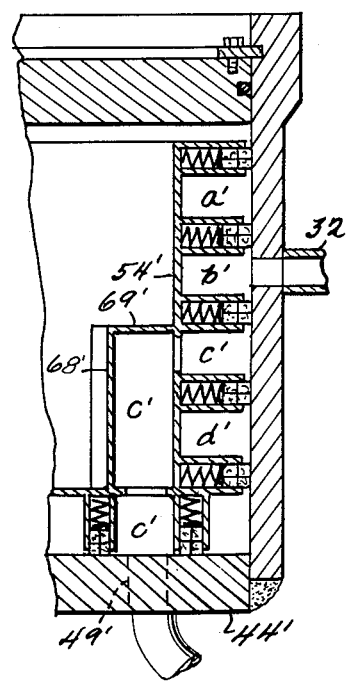
INVENTORS
DAN RINGO
ERNEST B. MILLER
BY
*Adams & Bush*
ATTORNEYS

United States Patent Office 2,751,032
Patented June 19, 1956

2,751,032

FLUID TREATING APPARATUS

Dan Ringo and Ernest B. Miller, Houston, Tex., assignors to Adsorption Research Corporation, Houston, Tex., a corporation of Texas Application November 9, 1954, Serial No. 467,750

4 Claims. (Cl. 183—4)

This invention relates to fluid treating apparatus of the type in which fluids, either liquid or gaseous, are brought into contact with the treating material, either a reactant material to effect a chemical reaction, and/or an absorbent material to adsorb liquid or gaseous products from the fluid being treated, and in which the treating material is stripped of its adsorbed products and/or is regenerated for further use. The present invention has more particular reference to fluid treating apparatus of the so-called continuous type.

One object of the present invention is to provide a novel and improved fluid treating apparatus providing for a plurality of separate, distinct and continuous flows of fluid therethrough and in which a plurality of closed vessels containing fluid treating material have one of their ends in communication with a first distribution chamber and the other of their ends in communication with a second distribution chamber; a rotatable valve mounted in each distribution chamber; and means for synchronously rotating the valves so that the flows of fluids through the apparatus will be directed successively through each of the vessels containing fluid treating material.

Another object of the invention is to provide fluid treating apparatus, as characterized above, in which a large surface area of relatively thin beds of fluid treating material offering a minimum of resistance to the flow of the fluids is condensed into a small cubic space.

Another object of the invention is to provide fluid treating apparatus, as characterized above, in which baffle members are provided to insure an even flow of the fluid through the treating material, thereby making effective use of all of the treating material and increasing the efficiency and capacity of the apparatus.

Another object of the invention is to provide fluid treating apparatus, as characterized above, in which the vessels containing the fluid treating material have readily accessible and removable cover plates so that the fluid treting material may readily be removed and replaced.

A further and more specific object of the present invention is to provide an improved apparatus for removing moisture and condensable hydrocarbons from natural gas.

Other objects and advantages of the invention will appear in the specification when considered in connection with the accompanying drawings, in which:

Fig. 5 is a horizontal cross sectional view taken on the line 5—5 of Fig. 3, but with parts omitted;

Fig. 6 is a fragmentary vertical cross sectional view, taken on the line 6—6 of Fig. 2;

Fig. 7 is a fragmentary vertical cross sectional view, taken on the line 7—7 of Fig. 2;

Fig. 10 is a vertical sectional view of one of the pressure vessels having a fluid treating material container mounted therein;

Fig. 11 is a vertical sectional view, with parts broken away, of the fluid treating material container shown in Fig. 10;

Fig. 12 is a plan view of the container shown in Fig. 13.

Fig. 17 is a horizontal cross sectional view taken on the line 17—17 of Fig. 15.

Fig. 18 is a fragmentary vertical cross sectional view taken on the line 18—18 of Fig. 14;

Fig. 19 is a fragmentary vertical cross sectional view, taken on the line 19—19 of Fig. 14;

Figure 1:
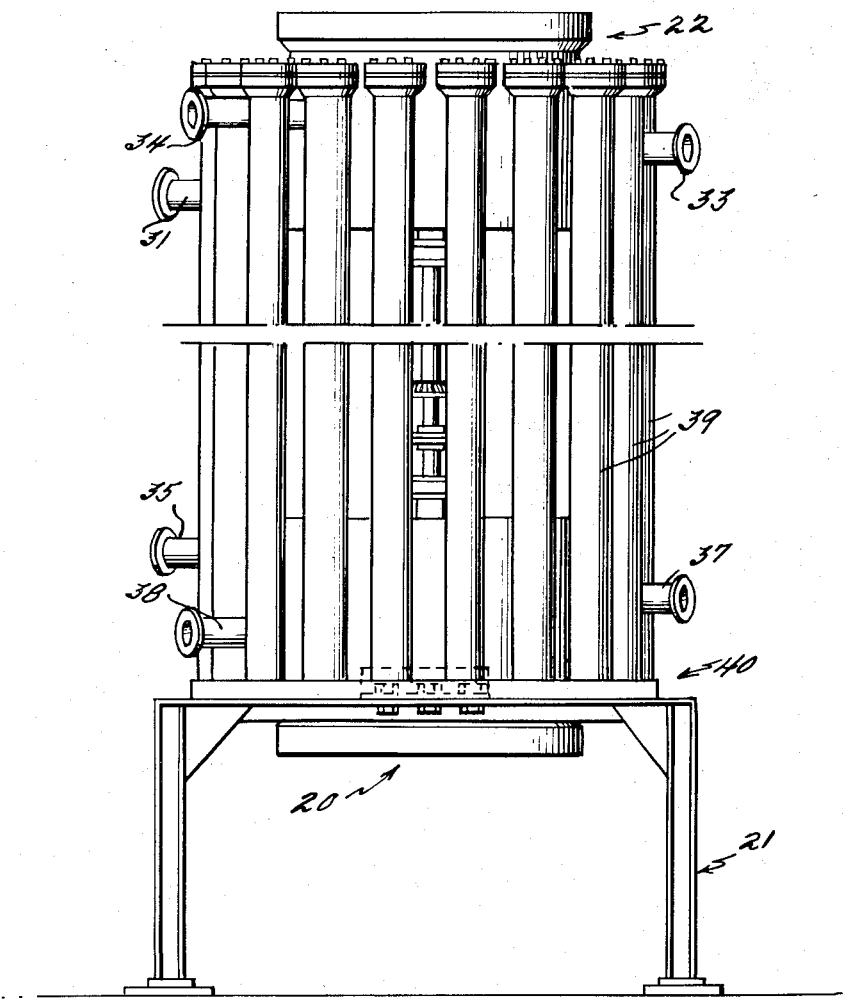
Fig. 1 is a side elevational view of one embodiment of fluid treating apparatus constructed in accordance with the present invention.

The present invention is an improvement over the apparatus shown in our co-pending application, Ser. No. 315,309, for Fluid Treating Apparatus, filed October 17, 1952.

In general, the present invention comprises a pair of cylindrical distribution chambers, each having a plurality of inlet-outlet conduits connected thereto and rotary valve means therein; a plurality of closed vessels each adapted to hold fluid treating material and having an inlet-outlet pipe connecting one end portion to one of the distribution chambers and an inlet-outlet pipe connecting the other end portion to the other distribution chamber; and means for synchronously rotating the valves in the distribution chamber, whereby each of the fluids admitted to one distribution chamber by one of the inlet-outlet conduits connected thereto will flow through successive groups of the pressure vessels containing the fluid treating material and from there to the other distribution chamber and out through the corresponding inlet-outlet conduit.

While the apparatus of the present invention may be employed for treating fluids, either liquid or gaseous, for various purposes, it will be described, by way of illustration, as used to remove moisture and condensable hydrocarbons from natural gas.

Referring now to Figs. 1 to 12, inclusive, there is shown one embodiment of fluid treating apparatus constructed in accordance with the present invention. As there shown, the apparatus comprises a lower cylindrical distribution chamber 20 mounted on suitable framework, indicated generally at 21; an upper cylindrical distribution chamber 22 mounted on suitable framework 23 which, in turn, is secured to the upper end of the lower distribution chamber; a rotatable vertical shaft 24 made of two parts coupled together, as by flanged coupling members 25 threaded on the shaft and bolted together.

The shaft has its upper and lower ends extending into the upper and lower distribution chambers, respectively, and has a beveled gear 26 secured thereon and connected to be rotated by suitable differential gearing indicated at 27, driven by a motor 28 suitably supported on a platform 29 carried by the framework 23; rotatable valves 30, each mounted within one of the distribution chambers and fixedly secured to the ends of the shaft 24 for rotation therewith; a plurality of fluid conduits, four being shown, 31, 32, 33, 34, connected to the side wall of the upper distribution chamber for the egress and ingress of fluid therefrom and thereto; a plurality of fluid conduits, four being shown, 35, 36, 37, 38, connected to the side wall of the lower distribution chamber for the egress and ingress of fluids therefrom and thereto; and a plurality of fluid treating pressure vessels 39 supported in a raised upright position encircling the distribution chambers, by a suitable framework, indicated generally at 40, with each of the vessels having an inlet pipe 41 connecting its upper end portion to the side wall of the upper distribution chamber and an outlet pipe 42 connecting its lower end portion to the side wall of the lower distribution chamber.

Figure 3:
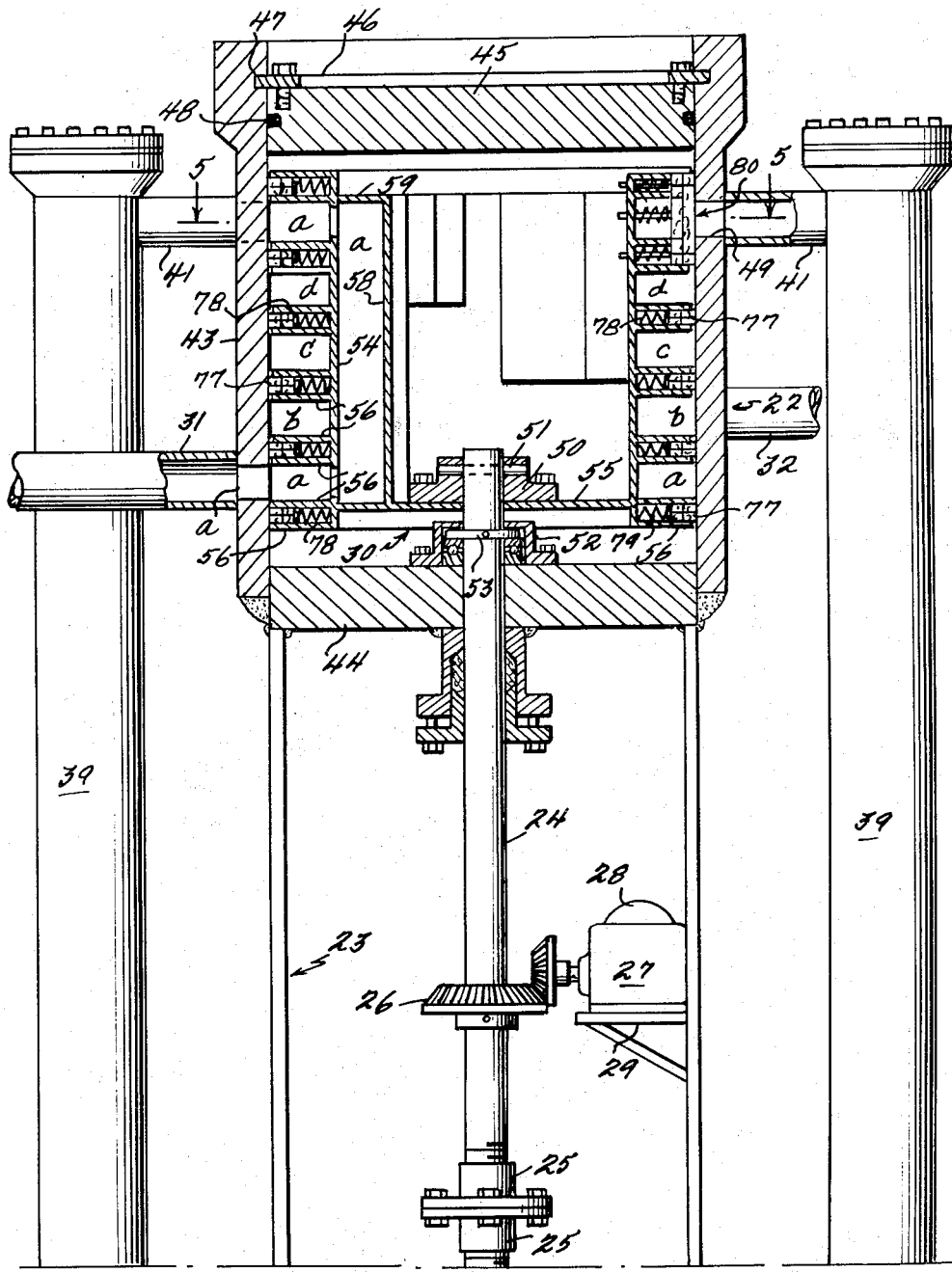
Fig. 3 is a fragmentary elevational view, partly in vertical cross section, taken on the line 3—3 of Fig. 2, and showing the upper end of the apparatus shown in Fig. 1.
Figure 4:
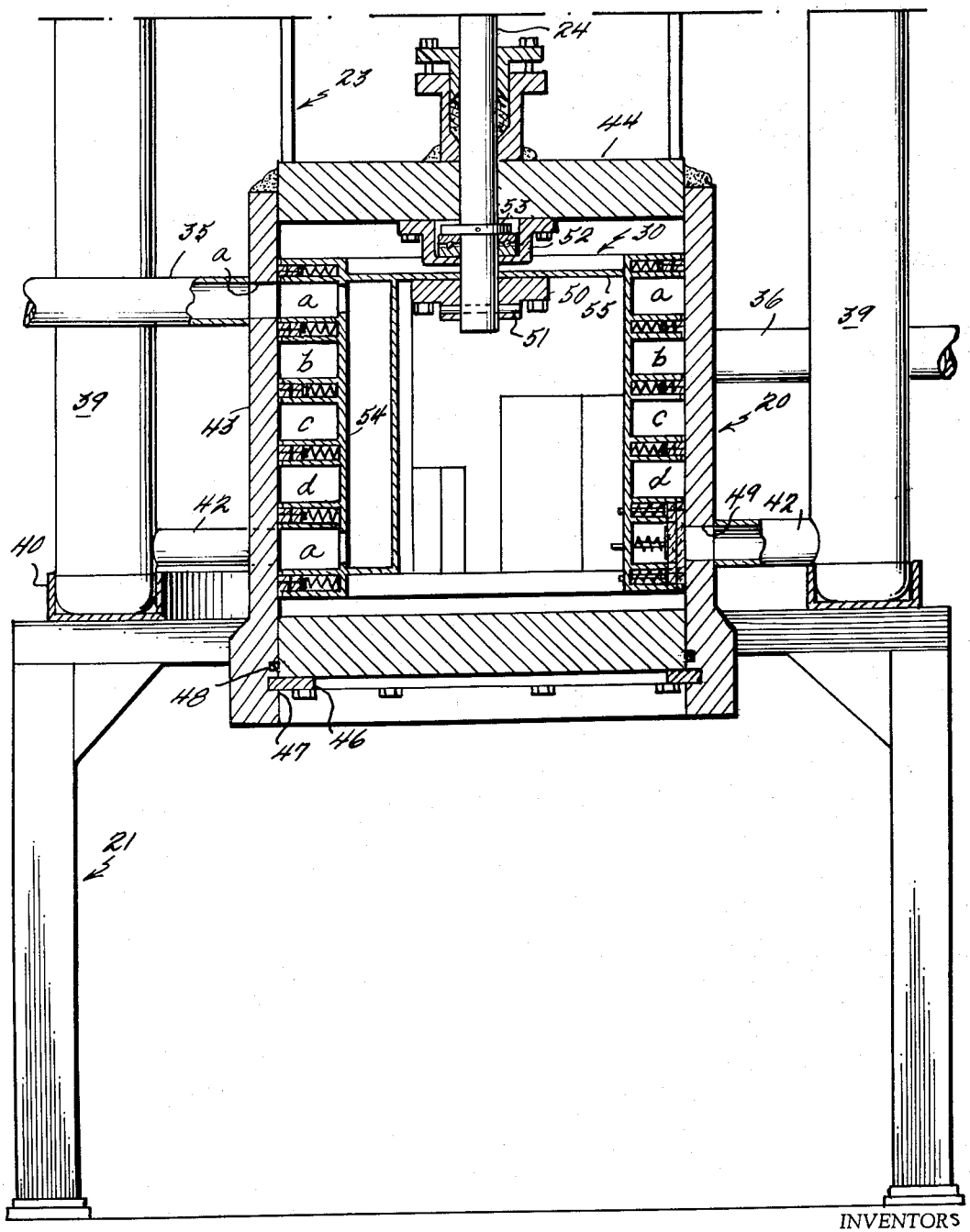
Fig. 4 is a view similar to that shown in Fig. 3, but showing the lower end of the apparatus shown in Fig. 1.

The upper and lower distribution chambers are identical in construction and, as shown in Figs. 3 and 4, each comprises a cylindrical member 43 having one end closed by an end closure disc 44 which may be formed integral therewith or secured thereto, as by welding, and the other end closed by an end closure disc 45 removably attached to the end of the cylinder, as by means of a split shear ring 46 bolted thereto and fitted into a circumferential recess 47 formed in the inner surface of the cylinder, and an O-ring packing 48 mounted between the closure disc 45 and the internal wall of the cylinder to insure gas-tightness of the chamber. The cylindrical member 43 is provided with a circumferential row of circumferentially spaced circular openings 49 adjacent the one end and a plurality of vertically and circumferentially spaced inlet-outlet openings, four being shown, which, for the purpose of clarity of description, are designated $a$, $b$, $c$ and $d$, respectively.

The four fluid conduits 31, 32, 33 and 34 are secured to the side wall of the upper distribution chamber for communication with the interior of the chamber through the openings $a$, $b$, $c$ and $d$, respectively. The four fluid conduits 35, 36, 37 and 38 are secured to the side wall of the lower distribution chamber for communication with the interior of the chamber through the openings $a$, $b$, $c$ and $d$, respectively. The ends of the inlet-outlet pipes 41 which connect the pressure vessels 39 to the upper distribution chamber are fitted into the circular openings 49 formed in the side wall thereof. The ends of the inlet-outlet pipes 42 which connect the pressure vessel 39 to the lower distribution chamber are fitted into the circular openings 49 formed in the side wall thereof.

The rotatable valves 30 are identical in construction and each is mounted within its respective distribution chamber between the end closure discs 44 and 45 and is fixedly connected to the shaft 24 for rotation therewith, as by means of flanged collars 50 keyed to the shaft and secured thereto, as by pins 51, and bolted to the valve member.

A support and thrust bearing member 52 is bolted to the inner side of the end closure disc 44 in each of the distribution chambers and carries ball races which engage a collar 53 pinned to the shaft 24.

The details of construction of the valve member 30 are best shown in Figs. 3 to 9, inclusive. As there shown, the valve member comprises a hollow cylindrical member 54 having one end closed by a closure disc 55, to which is secured, as aforesaid, the end of the shaft 24; a plurality of annular plates 56 each having their inner ends secured, as by welding, to the outer surface of the side wall of the cylindrical member 54, the plates 56 being arranged in pairs with the space between the plates forming each pair providing room for a sealing means, hereinafter to be described, and with the pairs vertically spaced from each other to form outwardly opening channels, five such channels being shown and, for the purpose of clarity of description, the four channels closest to the closure disc 55 being designated annular channels $a$, $b$, $c$ and $d$, respectively, and are so positioned as to communicate with the openings $a$, $b$, $c$ and $d$, formed in the side wall of the distribution chamber; the remaining outwardly opening channel, the one farthest from the end closure 55, is divided into a plurality of manifolds, four such being shown, and, for clarity of description, designated manifolds $a$, $b$, $c$ and $d$, respectively, by means of circumferentially spaced pairs of plates 57 extending transversely of the channel and with their inner and side edges secured to the outer surface of the cylindrical member 54 and the walls of the channel respectively, the spaces between the respective pairs of plates 57 providing room for cross sealing means, hereinafter to be described; the outwardly opening channel in which are formed the manifolds $a$, $b$, $c$ and $d$ is so positioned as to provide communication between each of the manifolds and a particular group of the circular openings 49 formed in the side wall of the distribution chamber; and a plurality of fluid passages or ports each connecting one of the annular channels $a$, $b$, $c$ and $d$ with one of the manifolds $a$, $b$, $c$ and $d$ and designated, for the purpose of clarity of description, ports $a$, $b$, $c$ and $d$.

The port $a$ is formed by an arcuate shaped inner side wall member 58 spaced inwardly from the side wall of the cylindrical member 54 and extending from the end closure disc 55 to a point opposite the upper wall of the manifold $a$; an arc-shaped top wall member 59 extending between the member 58 and the side wall of the cylindrical member 54; and end wall members 60, 61, extending between the top wall member 59 and the end closure disc 55, all of the wall forming members having their abutting edges welded togther to form gas-tight joints, so that the port will be gas-tight, see Figs. 3 and 5.

The port $b$ is formed by an arcuate shaped bottom wall member 62 extending radially inwardly from the side wall of the cylindrical members 54 at a point opposite the bottom wall of the annular channel $b$, an arcuate shaped inner side wall member 63 extending from the inner end of the bottom wall member 62 up to a point opposite the upper wall of the manifold $b$; a top wall member 64 extending between the side wall member 63 and the side wall of the cylindrical member 54 and end wall members 65, 66 extending between the top and bottom wall members 64, 62, all of the wall forming members having their abutting edges welded together to form gas-tight joints so that the port will be gas-tight, see Figs. 5 and 6.

The port $c$ is formed by an arcuate shaped bottom wall member 67 extending radially inwardly from the side wall of the cylindrical member 54 at a point opposite the bottom wall of the annular channel $c$, an arcuate shaped inner side wall member 68 extending from the inner end of the bottom wall member 67 up to a point opposite the upper wall of the manifold $c$; a top wall member 69 extending between the side wall member 68 and the side wall of the cylindrical member 54; and end wall members 70, 71 extending between the top and bottom wall members 69, 67, all of the wall forming members having their abutting edges welded together to form gas-tight joints so that the port will be gas tight, see Figs. 5 and 7.

The port $d$ is formed by an arcuate shaped bottom wall member 72 extending radially inwardly from the side wall of the cylindrical member 54 at a point opposite the bottom wall of the annular channel $d$; an arcuate shaped inner side wall member 73 extending from the bottom wall member 72 up to a point opposite the upper wall of the manifold $d$; a top wall member 74 extending between the side wall member 73 and the side wall of the cylindrical member 54; and end wall members 75, 76, extending between the top and bottom wall members 74, 72, all of the wall forming members having their abutting edges welded together to form gas-tight joints, so that the port will be gas-tight, see Figs. 5 and 6.

The valves 30 are mounted within their respective distribution chambers with the manifolds $a$, $b$, $c$ and $d$ slightly spaced from the side wall of the chamber and with each of the manifolds in horizontal alignment with a group of the circular openings 49 in the side wall of the chamber and with the annular channels $a$, $b$, $c$ and $d$ slightly spaced from the side wall of the chamber and with the annular channels $a$, $b$, $c$ and $d$ in horizontal alignment with the inlet, outlet openings $a$, $b$, $c$ and $d$, respectively, formed in the side wall of the chamber.

Figure 9:
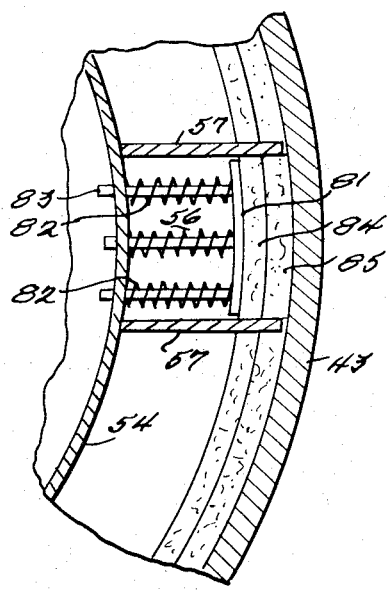
Fig. 9 is a fragmentary horizontal sectional view taken on the line 9—9 of Fig. 8.
Figure 8:
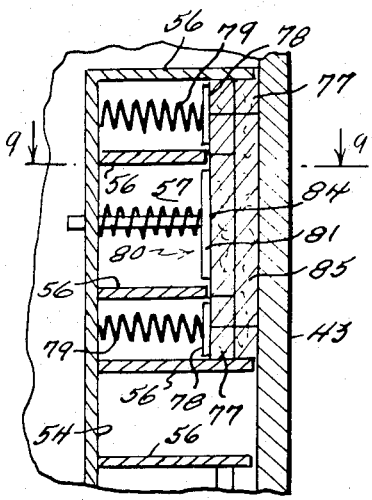
Fig. 8 is a fragmentary vertical cross sectional detail view showing the manner in which the packing is mounted in a cross seal.

The manner in which the annular channels and the manifolds are sealed off from the space within the distribution chamber is best shown in Figs. 3, 8 and 9. As there shown, the open outer ends of the annular channels are sealed off from each other by means of annular seals 77, each seated in the annular spaces between a pair of annular plates 56 (see Fig. 3), with their outer ends pressed into sealing engagement with the inner surface of the distribution chamber by means of split, flat annular metal strips 78 resting on the inner sides of the seals and pressed outwardly thereon, as by means of a plurality of circumferentially spaced coil springs 79. Each of the seals 77, preferably, and as shown, comprises a plurality of annular strips of packing, four such being shown, generally rectangular in cross section, and made of any suitable material, such as teflon or silica impregnated asbestos.

The open outer ends of the manifolds are sealed off from each other by means of cross seals 80 each seated in the space between a pair of the transverse plates 57 (see Figs. 3, 8 and 9), and with their outer sides pressed into sealing engagement with the inner surface of the distribution chamber by means of an arcuate shaped metal plate 81 movably mounted within the box-like frame formed by the transverse plates 57 and the annular plates 56 forming the top and bottom walls of the manifold, and resting on the inner sides of the seals and pressed outwardly thereon, as by means of a plurality of coil springs 82, mounted on stems 83 attached to the side wall of the cylindrical member 54 to hold the springs in proper position.

In order to make the cross seals more effective, portions of the outer edges of the parts of the annular plates 56 forming the top and bottom walls of the manifolds between the pair of transverse plates 57, are cut away (see Fig. 8) to permit the cross seal to be made of two arcuate shaped members 84 and 85. The inner member 84 extends across the cut away portions of the annular plates 56 and engage the inner edges of the adjacent annular sealing members 77. The outer member 85 extends above and below the inner member 84 and engages the inner edges of the outermost piece of the adjacent annular sealing members 77. In this connection, it should be noted that the adjacent annular sealing members 77 are shown as consisting of four square in cross section packing members, with portions of the lower and upper outermost members cut away between the transverse members 57. The cross seals are pressed outwardly with the outer members 85 pressed tightly against the inner surface of the distribution chamber.

Obviously, any leakage of fluid past the annular seals 77 and cross seals 80 serves to equalize the pressure on both sides of the seals and increases their sealing efficiency. The O-ring packings 48 and the shaft seals serve to prevent leakage from the distribution chambers.

The widths of the manifolds $a$, $b$, $c$ and $d$ are substantially the same as the internal diameters of the circular openings 49 in the walls of the distribution chambers and each of the cross seals 80 is of a width greater than the diameters of the circular openings 49, so that each cross seal can effectively seal off one of the openings 49.

Each of the openings 49 formed in the lower distribution chamber 20 is in vertical alignment with a corresponding one of the openings 49 formed in the upper distribution chamber 22 and each of the four cross seals 80, which separate the manifolds $a$, $b$, $c$ and $d$ formed in the lower valve 30, is in vertical alignment with a corresponding one of the cross seals 80 which separate the manifolds $a$, $b$, $c$ and $d$ formed in the upper valve 30.

When the rotary valves 30 are stationary, the foregoing arrangement, in effect, divides the pressure vessels 39 into four stages or groups, with one group connected to communicate with the manifolds $a$, one group connected to communicate with the manifolds $b$, one group connected to communicate with the manifolds $c$, and one group connected to communicate with the manifolds $d$, so that four separate, distinct and continuous flows of fluid may pass through the apparatus. Each flow entering the upper distribution chamber 22 by means of one of the inlet conduits 31, 32, 33 or 34, thence through one of the groups of pressure vessels 39 into the lower distribution chamber 20 and out through one of the outlet conduits 35, 36, 37 or 38. As the upper and lower valves rotate, each of the flows of fluid will successively pass through the pressure vessels 39.

The fluid treating material containing pressure vessels 39 are identical in construction and, as shown in Fig. 10, each comprises an elongated hollow cylindrical member 86 having a closed rounded bottom end and an open upper end provided with an integral flange 87 to which is secured, as by bolting a removable cover plate 88.

Horizontally disposed and vertically spaced annular discs 89, 90 are mounted in the upper and lower end portions, respectively, of the member 86 and secured therein, as by welding, to form a gas-tight joint between the outer peripheral edges of the discs and the side walls of the member 86. The diameter of the opening in the upper disc 89 is greater than the diameter of the opening in the lower disc 90 and a generally frusto-conically shaped, hollow, baffle member 91 extends between the discs 89 and 90 with its top end surrounding the opening in the upper disc 89 and its lower end secured to the disc 90, as by welding, along a circle spaced outwardly from the peripheral edge of the opening therein to leave an annular ledge 92 surrounding the opening. The annular ledge 92 forms a support for an elongated annular fluid treating material container 93. The container 93 is removably mounted within the frusto-conically shaped baffle member 91, with its bottom end resting on the ledge 92 and with its upper end extending through the opening in the upper disc 89.

The inlet pipe 41 is connected, as by welding, to the vessel 39 at a point above the upper annular disc 89 and the outlet pipe 42 is connected, as by welding, to the vessel 39 at a point below the lower annular disc 90, as shown in Fig. 10.

The containers 93 are identical in construction and, as shown in Figs. 11 and 12, each comprises two concentric tubular screens 94, 95, held in spaced-apart relation by a plurality of longitudinal radial fins 96, with the annular space between the screens closed at the bottom, as by a flanged annular plate 97. The mesh of the screens is such as to retain a granular fluid treating material 98 in the annular space between the screens. In the instant case, the fluid treating material 98 may be any absorbent having characteristics substantially like silica gel or the gel of other activated hydrous oxides. Preferably, silica gel is used.

Each of the containers 93 is closed at its top by means of concentric hoops or metal bands 99, 100 mounted on the concentric screens 94, 95, and a cover plate 101 detachably connected to the inner hoop or band 100, as by screws, and having a depending annular flange 102 fitting between the hoops or bands 99, 100. A depending cylindrical fin 103 is secured to the flange 102 and projects downwardly between and below the hoops or bands 94, 95, and fits in slits 104 formed in the upper ends of the radial fins 96, all as shown in Figs. 11 and 12. The construction is such that, as the silica gel settles down, leaving a space between the top portion of the wire screens devoid of silica gel, the fin 103 will prevent fluid from passing through the space.

Mounted within the inner wire screen 95 is an inverted substantially conically shaped baffle member 105. The baffle member 105 is closed at its apex which extends downwardly to a point near the bottom of the container and has its upper peripheral edge suitably secured to the band 100, as by welding. Preferably, the baffle member 105 is made of thin sheet metal.

When the container 93 is mounted within the hollow member 91, as shown in Fig. 10, the elongated annular space between the walls of the member 91 and the inverted conical baffle member 105 forms an elongated frusto-conically shaped duct which is annular in cross section. The annular container, filled with silica gel, is positioned in the duct between the members 91 and 105 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the baffle members 91 and 105, the entire barrier area is made use of with resultant increase in efficiency, capacity, and economy.

Figure 13:
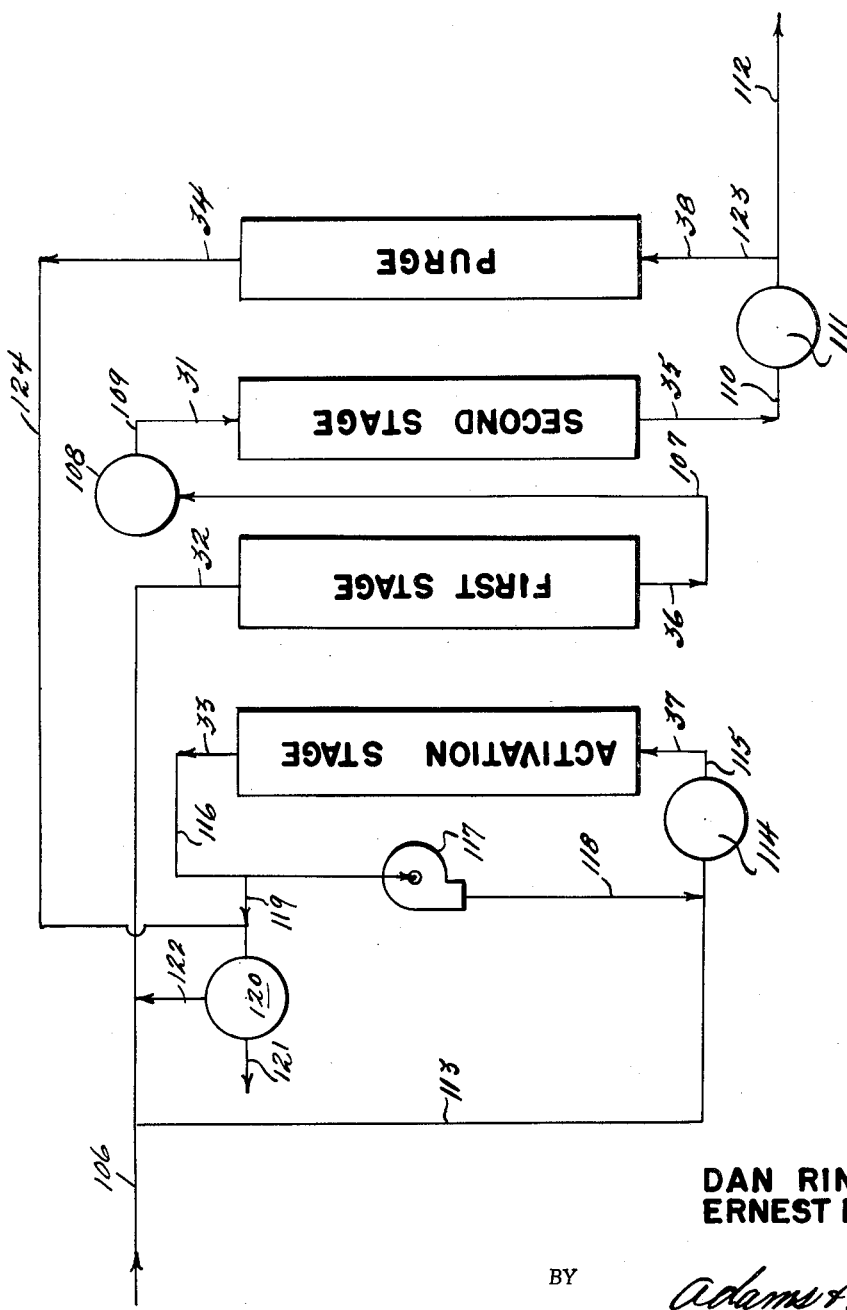
Fig. 13 is a schematic view showing the course of the fluid being treated through the first and second dehydration zones of the apparatus, the flow of the purging fluid through the purging zone and the flow of the regenerating fluid through the activation zone.
Figure 14:
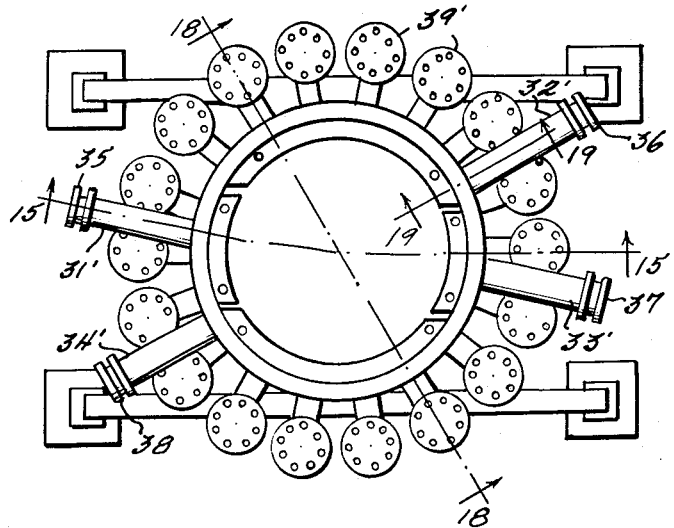
Fig. 14 is a plan view of a modified form of apparatus.
Figure 20:
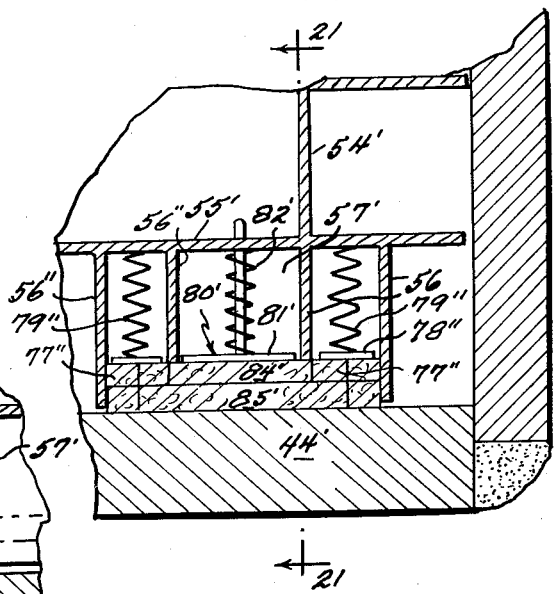
Fig. 20 is a fragmentary vertical cross sectional detail view showing the manner in which the packing is mounted in a cross seal of the modified form of apparatus shown in Fig. 14.
Figure 21:
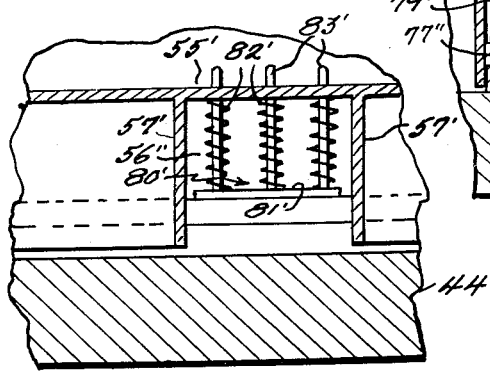
Fig. 21 is a fragmentary horizontal sectional view taken on the line 21—21 of Fig. 20.

The flows of the various fluids through the apparatus, shown in Fig. 1, are schematically shown in Fig. 13.

As there shown, the wet natural gas from which moisture and natural gasoline are to be removed, is supplied under high pressure (300 to 1000 pounds gauge) by pipe line 106 and enters the upper distribution chamber 22 of the apparatus through inlet conduit 32 and passes through inlet opening $b$ in the side wall of the chamber into the annular channel or annulus $b$ formed in the valve 30. From annulus $b$ the gas passes through port $b$ into manifold $b$ formed in the valve 30. From manifold $b$ the gas passes through openings 49 formed in the side wall of the upper distribution chamber 22 and inlet pipe 32 into the upper end portions of the group of pressure vessels 39 which are at that time in communication with manifold $b$. The gas passes down through the vessels 39 and through the silica gel beds therein into the bottoms of the vessels. The baffle members 91 and 105 within the vessels 39 insure a substantially uniform flow and distribution of the wet gas through the silica gel beds which absorb some of the moisture and gasoline content from the gas. From the bottoms of the vessels 39 the now partially dried gas passes through outlet pipes 42 and openings 49 in the side wall of the lower distribution chamber into manifold $b$ formed in the valve 30 in the lower distribution chamber. From manifold $b$ the gas passes through port $b$ into the channel or annulus $b$ formed in the valve 30 and thence through opening $b$ in the side wall of the chamber into the outlet conduit 36.

From the outlet conduit 36, the partially dried gas passes through pipe line 107 into an intercooler 108, where it is cooled. The intercooler 108 may be of the water circulating type. From the intercooler, the gas passes through pipe line 109, inlet conduit 31, and inlet opening $a$ in the side wall of the upper distribution chamber 22, into the annular channel or annulus $a$ in the upper valve 30. From the annulus $a$ the gas passes through port $a$ into manifold $a$ in the valve. From the manifold $a$ the gas passes through openings 49 formed in the side wall of the chamber and inlet pipes 41 into the upper end portions of the group of pressure vessels 39 which are at that time in communication with manifold $a$. The gas passes downwardly through the pressure vessels 39 of the second group and through the silica gel beds therein into the bottoms thereof. The remainder of the moisture and gasoline content of the gas being adsorbed during its passage through the silica gel beds.

From the bottoms of the vessels 39 of the second group, the now dried gas passes through outlet pipes 42 and openings 49 in the side wall of the lower distribution chamber into manifold $a$ in the lower valve 30. From the manifold $a$ the gas passes through port $a$ into the annular channel or annulus $a$ formed in the valve 30 and thence through outlet opening $a$ in the side wall of the chamber into the outlet conduit 35, and through pipe line 110 to the after cooler 111, and from there through pipe line 112 to the various points of use.

A portion of the incoming wet gas is diverted from the supply line 106, by means of a pipe line 113, through a heater 114, where its temperature is raised to from 350° F. to 450° F., depending upon its moisture content and the type of hydrocarbons to be recovered. From the heater 114, the heated gas passes through pipe line 115, inlet conduit 37, and inlet opening $c$ in the side wall of the lower distribution chamber 20, into annular channel or annulus $c$ in the lower valve 30. From the annulus $c$ the heated gas passes through port $c$ into manifold $c$ in the valve. From the manifold $c$ the gas passes through openings 49 formed in the side wall of the chamber and inlet pipes 42 into the lower end portions of the group of pressure vessels 39 which are at that time in communication with the manifold $c$. The heated gas passes upwardly through the pressure vessels of the third group and through the silica gel beds therein into the tops of the vessels. As the heated gas passes through the silica gel beds it removes the moisture and natural gasoline therefrom. From the tops of the vessels 39 of the third group, the hot, moisture and gasoline laden gas passes through outlet pipes 41 and openings 49 in the side wall of the upper distribution chamber 22 into manifold $c$ in the upper valve 30. From the manifold $c$ the gaseous mixture passes through port $c$ into the annular channel or annulus $c$ formed in the valve and thence through outlet opening $c$ in the side wall of the chamber into the outlet conduit 33 and from there through pipe line 116 back to a fan or blower 117, and is recirculated through pipe line 118, the heater 114, and the activation zone of the apparatus. A portion of the hot gas and vapor stripped from the adsorbent beds in the activation zone of the apparatus is continuously withdrawn through pipe line 119 and passes through a condenser separator 120, where the moisture and natural gasoline are condensed and removed through drain pipe 121. From the condenser separator 120, the gas passes through pipe line 122, back into the supply line 106, where it is mixed with the incoming gas on the way to the first dehydration zone of the apparatus. A portion of the dehydrated gas is diverted from the pipe line 112, after it has passed through the after cooler 111, by means of a pipe line 123, and passes through pipe line 123, inlet conduit 38, and inlet opening $d$ in the side wall of the lower distribution chamber 20, into annulus $d$ in the lower valve 30. From the annulus $d$ the gas passes through port $d$ into manifold $d$ in the valve. From the manifold $d$ the gas passes through openings 49 formed in the side wall of the chamber and inlet pipes 42 into the lower end portions of the group of pressure vessels 39 which are at that time in communication with the manifold $d$. The gas passes upwardly through the pressure vessels of the fourth group and through the silica gel beds therein into the tops of the vessels. As the gas passes through the silica gel beds it removes all remaining activation gas and any remaining moisture and natural gasoline deposited on the beds, thereby purging them.

From the tops of the vessels 39 of the fourth group, the purging gas passes through outlet pipes 41 and openings 49 in the side wall of the upper distribution chamber 22 into the manifold $d$ in the upper valve 30. From the manifold $d$ the gas passes through port $d$ into the annulus $d$ formed in the valve, and thence through outlet opening $d$ in the side wall of the chamber into the outlet conduit 34 and from there through pipe line 124 back to pipe line 119 and to the condenser 120.

The gas being dehydrated makes two passages through groups of the silica gel containing pressure vessels, while the heated gas or reactivation medium and the purging medium each make a single passage through a group of the silica gel containing pressure vessels. For convenience in description, the pressure vessels which form the group through which the first dehydrating passage is made is called the first dehydration stage, the group through which the second dehydrating passage is made is called the second dehydration stage, the group through which the hot gas used for reactivation passes is called the reactivation stage, and the group through which the purging medium passes is called the purging stage. Also, the pressure vessels are called zones in which either dehydration, reactivation or purging takes place, depending upon the particular fluid flowing therethrough at a given time.

Figure 2:
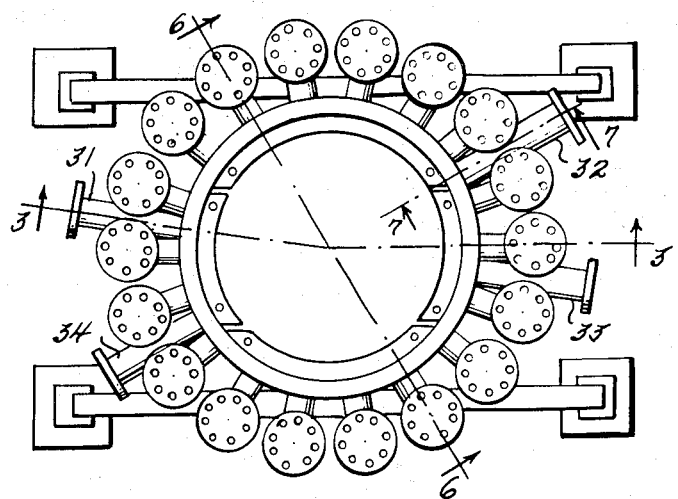
Fig. 2 is a plan view of the apparatus shown in Fig. 1.

In the particular embodiment of the invention illustrated in Fig. 1, the valves 30 are rotated clockwise, as viewed in Figs. 2 and 5, and at a rate of 1 revolution every 10 minutes; thus, it will be seen that, as the valves 30 rotate, each of the pressure vessels 39 will be successively brought into communication with the manifolds $a$, $b$, $c$ and $d$ in the upper and lower distribution chambers, so that each pressure vessel 39 will, in turn, become an activation zone, a purging zone, a second dehydration zone, and a first dehydration zone.

While in the particular embodiment of apparatus shown in Figs. 1 to 12, inclusive, the inlet-outlet pipes 41, which connect the upper end portions of the pressure vessels 39 to the upper distribution chamber and the inlet-outlet pipes 42, which connect the lower end portions of the pressure vessels 39 to the lower distribution chamber, are shown as entering the cylindrical side walls of the respective chambers, it sometimes may be found desirable and preferable to have these pipes enter one of the end walls of the respective distribution chambers. Such a modified form of apparatus is shown in Figs. 14 to 21 inclusive.

The modified form of apparatus shown in Figs. 14 to 21, inclusive, is generally similar to the modification shown in Figs. 1 to 12, inclusive, and comprises a lower cylindrical distribution chamber 20' mounted on suitable framework, indicated generally at 21'; an upper cylindrical distribution chamber 22' mounted on suitable framework 23' which, in turn, is secured to the upper end of the lower distribution chamber; a rotatable vertical shaft 24' made of two parts coupled together, as by flanged coupling members 25' threaded on the shaft and bolted together, the shaft has its upper and lower ends extending into the upper and lower distribution chambers, respectively, and has a beveled gear 26' secured thereon and connected to be rotated by suitable differential gearing indicated at 27', driven by a motor 28' suitably supported on a platform 29' carried by the framework 23'; rotatable valves 30', each mounted within one of the distribution chambers and fixedly secured to the ends of the shaft 24' for rotation therewith; a plurality of fluid conduits, four being shown, 31', 32', 33', 34', connected to the side wall of the upper distribution chamber for the egress and ingress of fluid therefrom and thereto; a plurality of fluid conduits, four being shown, 35', 36', 37', 38', connected to the side wall of the lower distribution chamber for the egress and ingress of fluids therefrom and thereto; and a plurality of fluid treating pressure vessels 39' supported in a raised upright position encircling the distribution chambers, by a suitable framework, indicated generally at 40', with each of the vessels having an inlet pipe 41' connecting its upper end portion to the bottom wall of the upper distribution chamber and an outlet pipe 42' connecting its lower end portion to the top wall of the lower distribution chamber.

Figure 15:
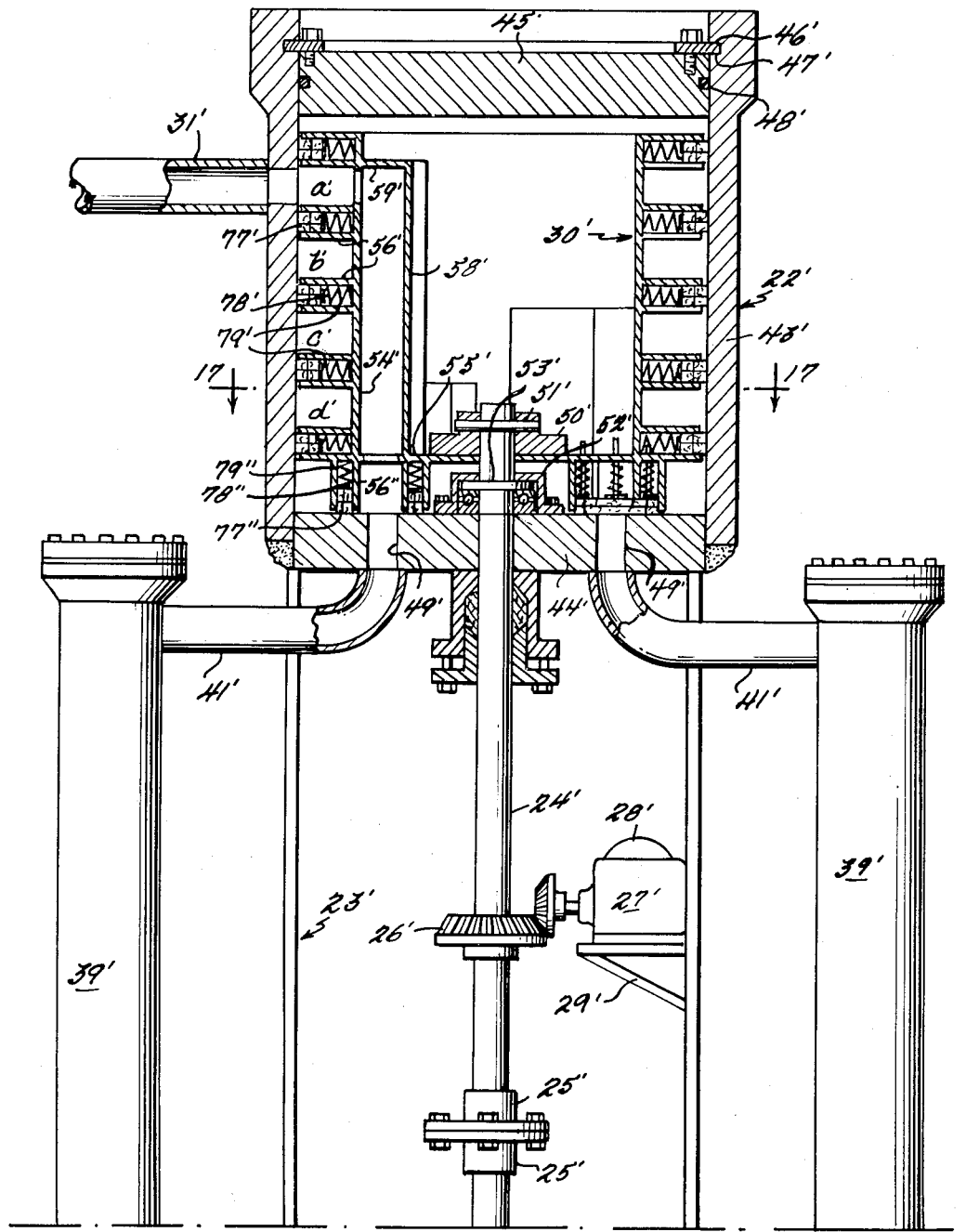
Fig. 15 is a fragmentary elevational view, partly in cross section, taken on the line 15—15 of Fig. 14 and showing the upper end of the apparatus.
Figure 16:
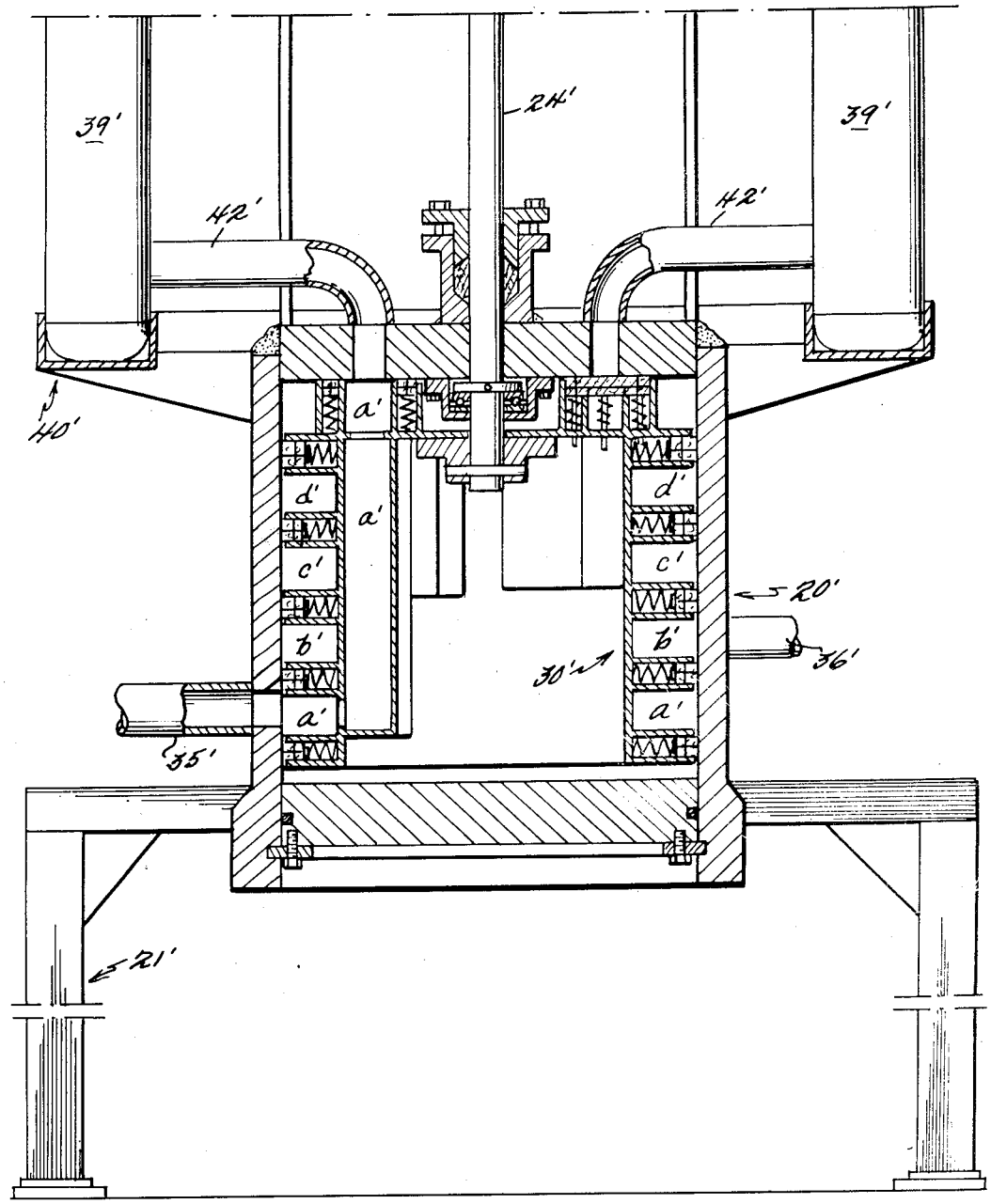
Fig. 16 is a view similar to that shown in Fig. 15, but showing the lower end of the apparatus.

The upper and lower distribution chambers are identical in construction and, as shown in Figs. 15 and 16, each comprises a cylindrical member 43' having one end closed by an end closure disc 44' which may be formed integral therewith or secured thereto, as by welding, and the other end closed by an end closure disc 45' removably attached to the end of the cylinder, as by means of a split shear ring 46' bolted thereto and fitted into a circumferential recess 47' formed in the inner surface of the cylinder, and an O-ring packing 48' mounted between the closure disc 45' and the internal wall of the cylinder to insure gas-tightness of the chamber. The end closure disc 44' is provided with a circumferential row of circumferentially spaced circular openings 49'. The cylindrical member 43' is provided with a plurality of vertically and circumferentially spaced inlet-outlet openings, four being shown, which, for the purpose of clarity of description, are designated $a'$, $b'$, $c'$ and $d'$, respectively.

The four fluid conduits 31', 32', 33' and 34' are secured to the side wall of the upper distribution chamber for communication with the interior of the chamber through the openings $a'$, $b'$, $c'$ and $d'$, respectively. The four fluid conduits 35', 36', 37' and 38' are secured to the side wall of the lower distribution chamber for communication with the interior of the chamber through the openings $a'$, $b'$, $c'$, and $d'$, respectively. The ends of the inlet-outlet pipes 41' which connect the pressure vessel 39' to the upper distribution chamber are fitted into the circular openings 49' formed in the end closure disc 44' thereof. The ends of the inlet-outlet pipes 42' which connect the pressure vessel 39' to the lower distribution chamber are fitted into the circular openings 49' formed in the end closure disc 44' thereof.

The rotatable valves 30' are identical in construction and each is mounted within its respective distribution chamber between the end closure discs 44' and 45' and is fixedly connected to the shaft 24' for rotation therewith, as by means of flanged collars 50' keyed to the shaft and secured thereto, as by pins 51', and bolted to the valve member.

A support and thrust bearing member 52' is bolted to the inner side of the end closure disc 44' in each of the distribution chambers and carries ball races which engage a collar 53' pinned to the shaft 24'.

The details of construction of the valve member 30' are best shown in Figs. 15 to 21, inclusive. As there shown, the valve member comprises a hollow cylindrical member 54' having one end closed by a closure disc 55', to which is secured, as aforesaid, the end of the shaft 24'; a plurality of annular plates 56' each having their inner ends secured, as by welding, to the outer surface of the side wall of the cylindrical member 54', the plates 56' being arranged in pairs with the space between the plates forming each pair providing room for a sealing means, hereinafter to be described, and with the pairs vertically spaced from each other to form outwardly opening channels, four such channels being shown and, for the purpose of clarity of description, designated annular channels $a'$, $b'$, $c'$ and $d'$, respectively, and are so positioned as to communicate with the openings $a'$, $b'$, $c'$ and $d'$, formed in the side wall of the distribution chamber; two pairs of annular plates 56'' each plate having its inner end secured, as by welding, to the bottom surface of the valve member, with the space between the plates forming each pair providing room for a sealing means hereinafter to be described, and with the space between the pairs forming an outwardly opening channel which is divided into a plurality of manifolds, four such being shown, and, for clarity of description, designated manifolds $a'$, $b'$, c' and d', respectively, by means of circumferentially spaced pairs of plates 57' extending transversely of the channel and with their inner and side edges secured to the outer surface of the closure member 55' and the walls of the channel respectively, the spaces between the respective pairs of plates 57' providing room for cross sealing means, hereinafter to be described, the outwardly opening channel in which are formed the manifolds a', b', c' and d' is so positioned as to provide communication between each of the manifolds and a particular group of the circular openings 49' formed in the end closure disc 44' of the distribution chamber; and a plurality of fluid passages or ports each connecting one of the annular channels a', b', c' and d' with one of the manifolds a', b', c' and d' and designated, for the purpose of clarity of description, ports a', b', c' and d'.

The port a' is formed by an arcuate shaped inner side wall member 58' spaced inwardly from the side wall of the cylindrical member 54' and extending from the end closure disc 55' to a point opposite the upper wall of the annular channel a'; an arc-shaped top wall member 59' extending between the member 58' and the side wall of the cylindrical member 54'; and end wall members 60', 61', extending between the top wall member 59' and the end closure disc 55', all of the wall forming members having their abutting edges welded together to form gas-tight joints, so that the port will be gas-tight.

The port b' is formed by an arcuate-shaped inner side wall member 63' spaced inwardly from the side wall of the cylindrical member 54' and extending from the end closure disc 55' to a point opposite the upper wall of the annular channel b'; an arc-shaped top wall member 64' extending between the member 63' and the side wall of the cylindrical member 54'; and end wall members 65', 66' extending between the top wall member 64' and the closure disc 55', all of the wall forming members having their abutting edges welded together to form gas-tight joints so that the port will be gas-tight.

The port c' is formed by an arcuate-shaped inner side wall member 68' spaced inwardly from the side wall of the cylindrical member 54' and extending from the end closure disc 55' to a point opposite the upper wall of the annular channel c'; an arc-shaped top wall member 69' extending between the member 68' and the side wall of the cylindrical member 54'; and end wall members 70', 71' extending between the top wall member 64' and the closure disc 55', all of the wall forming members having their abutting edges welded together to form gas-tight joints so that the port will be gas-tight.

The port d' is formed by an arcuate-shaped inner side wall member 73' spaced inwardly from the side wall of the cylindrical member 54' and extending from the end closure disc 55' to a point opposite the upper wall of the annular channel d'; and arc-shaped top wall member 74' extending between the member 73' and the side wall of the cylindrical member 54'; and end wall members 75', 76' extending between the top wall member 74' and the closure disc 55'; all of the wall forming members having their abutting edges welded together to form gas-tight joints so that the port will be gas-tight.

The valves 30' are mounted within their respective distribution chambers with the manifolds a', b', c' and d' slightly spaced from the inner surface of the end closure discs 44' of the chamber and with each of the manifolds in vertical alignment with a group of the circular openings 49' in the end closure disc 44' and with the annular channels a', b', c' and d' slightly spaced from the wide wall of the chamber and with the annular channels a', b', c' and d' in horizontal alignment with the inlet, outlet openings a', b', c' and d', respectively, formed in the side wall of the chamber.

The manner in which the annular channels a', b', c' and d' are sealed off from the space within the distribution chamber is best shown in Figs. 15, 16, 17, 18 and 19. As there shown, the open outer ends of the annular channels are sealed off from each other by means of annular plates 56' (see Fig. 15), with their outer ends pressed into sealing engagement with the inner surface of the distribution chamber by means of split, flat annular metal strips 78' resting on the inner sides of the seals and pressed outwardly thereon, as by means of a plurality of circumferentially spaced coil springs 79'. Each of the seals 77', preferably, and as shown, comprises a plurality of annular strips of packing, four such being shown, generally rectangular in cross section, and made of any suitable material, such as teflon or silica impregnated asbestos.

The annular channel formed on the outer surface of the end closure disc 55', and in which the manifolds a', b', c' and d' are located, is sealed off from the space within the distributor chamber as by means of annular seals 77'', each seated in the annular space between a pair of annular plates 56'' (see Fig. 15), with their outer ends pressed into sealing engagement with the inner surface of the end closure disc 44' by means of split, flat annular metal strips 78'' on the inner sides of the seals and pressed outwardly thereon, as by means of a plurality of circumferentially spaced coil springs 79''. Each of the seals 77'', preferably, and as shown, comprises a plurality of annular strips of packing, four such being shown, generally rectangular in cross section, and made of any suitable material, such as teflon or silica impregnated asbestos.

The open outer ends of the manifolds are sealed off from each other by means of cross seals 80', each seated in the space between a pair of the transverse plates 57' (see Figs. 15, 20 and 21); and with their outer sides pressed into sealing engagement with the inner surface of the end closure disc 44' of the distribution chamber by means of an arcuate-shaped metal plate 81' movably mounted within the box-like frame formed by the transverse plates 57' and the annular plates 56'' forming the side walls of the manifold and resting in the inner sides of the seals and pressed outwardly thereon, as by means of a plurality of coil springs 82' mounted on stems 83' attached to the closure member 55' of the cylindrical member 54' to hold the springs in proper position.

In order to make the cross seals more effective, portions of the outer edges of the parts of the annular plates 56'' forming the side walls of the manifolds between the pair of transverse plates 57' are cut away (see Fig. 20), to permit the cross seal to be made of two arcuate-shaped members 84' and 85'. The inner member 84' extends across the cut away portions of the annular plates 56'' and engage the inner edges of the adjacent annular sealing members 77''. The outer member 85' extends beyond the side edges of the inner member 84' and engages the inner edges of the outermost piece of the adjacent annular sealing members 77''. In this connection, it should be noted that the adjacent annular sealing members 77'' are shown as consisting of four square-in-cross-section packing members, with portions of the lower and upper outermost members cut away between the transverse members 57'. The cross seals are pressed outwardly with the outer members 85' pressed tightly against the inner surface of the end closure disc 44' of the distribution chamber.

Obviously, any leakage of fluid past the annular seals 77'' and cross seals 80' serves to equalize the pressure on both sides of the seals and increases their sealing efficiency. The O-ring packings 48' and the shaft seals serve to prevent leakage from the distribution chambers.

The widths of the manifolds a', b', c' and d' are substantially the same as the internal diameters of the circular openings 49' in the end closure disc 44' of the distribution chambers and each of the cross seals 80' is of a width greater than the diameters of the circular openings 49', so that each cross seal can effectively seal off one of the openings 49'.

Each of the openings 49' formed in the lower distribution chamber 20' is in vertical alignment with a corresponding one of the openings 49' formed in the upper distribution chamber 22' and each of the four cross seals 80', which separate the manifolds a', b', c' and d' formed in the lower valve 30', is in vertical alignment with a corresponding one of the cross seals 80' which separate the manifolds a', b', c' and d' formed in the upper valve 30'.

When the rotary valves 30 are stationary, the foregoing arrangement, in effect, divides the pressure vessels 39' into four states or groups, with one group connected to communicate with the manifolds a', one group connected to communicate with the manifolds b', one group connected to communicate with the manifolds c', and one group connected to communicate with the manifolds d', so that four, separate, distinct and continuous flows of fluid may pass through the apparatus. Each flow entering the upper distribution chamber 22' by means of one of the inlet conduits 31', 32', 33', or 34', thence through one of the groups of pressure vessels 39' into the lower distribution chamber 20' and out through one of the outlet conduits 35', 36', 37' or 38'. As the upper and lower valves rotate, each of the flows of fluid will successively pass through the pressure vessels 39'.

The fluid treating material containing pressure vessels 39' are identical in construction to the pressure vessels 39 shown in the modification illustrated in Figs. 1 to 12, inclusive. The flows of fluids through the apparatus illustrated in Figs. 14 to 21, are generally similar to the flows through the apparatus illustrated in Figs. 1 to 12.

From the foregoing, it readily will be seen that there has been provided novel apparatus for treating fluids, either liquid or gaseous; one that is particularly adapted to treat such fluids while under high pressure; and one which provides for one or more passages of the fluid being treated through the apparatus.

While the flows of fluid through the apparatus have been described as entering the top distribution chamber and flowing downward to and out of the bottom distribution chamber, obviously, the flows may be in either direction.

Obviously, too, the present invention is not restricted to the particular embodiments thereof herein shown and described. Moreover, it is not indispensible that all of the features of the invention be used conjointly, since they may be advantageously employed in various combinations and sub-combinations.

What is claimed is:

1. Apparatus for treating fluids comprising a plurality of closed vessels adapted to contain fluid treating material; a pair of spaced-apart, hollow, cylindrical distribution chambers having closed top, bottom and side walls, each of said chambers having one wall provided with a circular row of circular openings for the passage of fluids; at least two conduits connected to one of the walls of one of said chambers for the passage of fluids thereto and therefrom; at least two conduits connected to one of the walls of the other of said chambers for the passage of fluids thereto and therefrom; a group of pipes each connecting one end portion of one of said closed vessels with one of said circular openings in one of said distribution chambers and a second group of pipes each connecting the other end portion of one of said closed vessels with one of the circular openings in the other of said distribution chambers; valve means mounted in each of said distribution chambers for rotation about the longitudinal axis thereof, each of said valve means including at least two annular trough-shaped conduits, each having its closed bottom side extending inwardly with respect to said chamber and its open outer side in communication with one of said conduits and with the outer ends of its walls in sealing engagement with the wall of the chamber to which the conduits are connected, and at least two circumferentially spaced arc-shaped and trough-shaped closed end conduits each having its closed bottom side extending inwardly with respect to said chamber and its open outer side positioned to communicate with a group of the circular openings in the distribution chamber and with the outer ends of its side and end walls in sealing engagement with the walls of the chamber in which the circular openings are formed; and at least two ports, each forming a passageway connecting one of the annular conduits with one of the arc-shaped conduits; the construction and arrangement being such that at least two separate, distinct and continuous flows of fluid may flow through the apparatus; and means for synchronously rotating the valve means so that the separate flows of fluid will be directed successively through the vessels containing fluid treating material.

2. Apparatus as set forth in claim 1, wherein the circular row of circular openings formed in one wall of each of the distribution chambers is formed in the cylindrical side wall thereof and wherein the conduits connected to one of the walls of each of said distribution chambers are connected to the cylindrical side wall thereof in axially spaced relation.

3. Apparatus as set forth in claim 1, wherein the circular row of circular openings formed in one wall of each of the distribution chambers is formed in one of the end walls thereof and wherein the conduits connected to one of the walls of each of said distribution chambers are connected to the cylindrical side wall thereof in axially spaced relation.

4. Apparatus as set forth in claim 1, wherein said distribution chambers are mounted one above the other in vertically spaced upright position and wherein the means for rotating the valve means in each of said distribution chambers includes a vertical shafting extending between and into each of said chambers.

References Cited in the file of this patent

UNITED STATES PATENTS 2,355,024    Yerrick _____ Aug. 1, 1944